US010982983B2

(12) United States Patent
Robl

(10) Patent No.: US 10,982,983 B2
(45) Date of Patent: Apr. 20, 2021

(54) METHOD FOR OPERATING A MEASURING TRANSDUCER, AND CORRESPONDING MEASURING TRANSDUCER

(71) Applicant: Endress+Hauser Conducta GmbH+Co. KG, Gerlingen (DE)

(72) Inventor: Stefan Robl, Hünxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 230 days.

(21) Appl. No.: 15/841,699

(22) Filed: Dec. 14, 2017

(65) Prior Publication Data
US 2018/0164130 A1    Jun. 14, 2018

(30) Foreign Application Priority Data
Dec. 14, 2016   (DE) .................. 10 2016 124 326.4

(51) Int. Cl.
| G01D 15/06 | (2006.01) |
| G05B 19/418 | (2006.01) |
| G05B 19/042 | (2006.01) |
| G01D 18/00 | (2006.01) |
| G06F 9/455 | (2018.01) |
| G06F 11/263 | (2006.01) |
| G06F 15/04 | (2006.01) |

(52) U.S. Cl.
CPC ............ *G01D 15/06* (2013.01); *G01D 18/00* (2013.01); *G05B 19/0426* (2013.01); *G05B 19/4183* (2013.01); *G06F 9/45508* (2013.01); *G06F 11/263* (2013.01); *G06F 15/04* (2013.01); *G05B 2219/31161* (2013.01); *Y02P 90/02* (2015.11)

(58) Field of Classification Search
CPC .... G01D 15/06; G01D 18/00; G05B 19/0426; G05B 19/4183; G06F 9/45508; G06F 11/263; G06F 15/04
See application file for complete search history.

(56) References Cited

U.S. PATENT DOCUMENTS

| 2005/0199743 | A1* | 9/2005 | Hochstein, Jr. ....... | B08B 7/0007 239/67 |
| 2011/0153259 | A1* | 6/2011 | Michael ............... | G01N 27/286 702/123 |
| 2018/0113573 | A1* | 4/2018 | Kulus ................... | G06F 3/0482 |

FOREIGN PATENT DOCUMENTS

| CN | 101228488 A | 7/2008 |
| CN | 102498443 A | 6/2012 |
| CN | 104951333 A | 9/2015 |

(Continued)

OTHER PUBLICATIONS

Search Report for German Patent Application No. 10 2016 124 326.4, German Patent Office, dated Sep. 29, 2017, 11 pp.

(Continued)

*Primary Examiner* — Bryan Bui
(74) *Attorney, Agent, or Firm* — Mark A. Logan; Endress+Hauser (USA) Holding Inc.

(57) ABSTRACT

The present disclosure relates to a method for operating a measuring transducer of process automation technology, comprising at least the following steps: starting the measuring transducer by starting its operating system, wherein the operating system provides at least one interface; starting at least one interpreter, wherein the interpreter accesses the interface; and executing an extension in the interpreter. The present disclosure further relates to a measuring transducer for implementing the method.

18 Claims, 5 Drawing Sheets

(56) References Cited

FOREIGN PATENT DOCUMENTS

| | | |
|---|---|---|
| DE | 10343670 A1 | 5/2005 |
| DE | 102009045386 A1 | 4/2011 |
| DE | 102010062266 A1 | 6/2012 |
| DE | 102011078366 A1 | 1/2013 |
| DE | 102011086630 A1 | 5/2013 |
| DE | 102012112427 A1 | 6/2014 |
| DE | 102013108478 A1 | 2/2015 |

OTHER PUBLICATIONS

Levasseur, Joshua Thomas, Device driver reuse via virtual machines, New South Wales, 2009 184 S.—New South Wales, Univ., Diss., May 2009, 184 pp.

Neto, et al., Scriptable Operating Systems with Lua, In: Proceedings of the 10th ACM Symposium on dynamic languages, Portland, Oregon USA. Oct. 20-24, 2014, New York: ACM, 2014, S. 2-10,—ISBN 978-1-4503-3211-8, 9 pp.

* cited by examiner

METHOD FOR OPERATING A MEASURING TRANSDUCER, AND CORRESPONDING MEASURING TRANSDUCER

CROSS-REFERENCE TO RELATED APPLICATION

The present application is related to and claims the priority benefit of German Patent Application No. 10 2016 124 326.4, filed on Dec. 14, 2016, the entire contents of which are incorporated herein by reference.

TECHNICAL FIELD

The present disclosure relates to a method for operating a measuring transducer of process automation technology. The present disclosure furthermore relates to a corresponding measuring transducer.

BACKGROUND

Generally speaking, a measuring transducer also called a transmitter is a device that converts an input variable into an output variable according to a fixed relationship. In process automation technology, a sensor is, for example, connected to a measuring transducer. The raw measured values of the sensor are processed in the measuring transducer, e.g., averaged or converted by means of a calibration model to another variable for example, the process variable to be determined and possibly transmitted to a control system, for example.

Generally, a cable for connection to the sensor is connected to the measuring transducer. The measuring transducer is in this case a separate device with a separate housing and various interfaces. Alternatively, the measuring transducer can be integrated, e.g., in the form of a circuit possibly as a microcontroller or something similar into a cable or directly into a plug connection (see below).

The connection of the cable to the sensor is frequently accomplished via a plug connection, e.g., by galvanically decoupled especially, inductive interfaces. Thus, electrical signals can be transmitted contactlessly. Advantages with regard to corrosion protection, electrical isolation, prevention of mechanical wear of the plug, etc., are shown by this galvanic isolation. The applicant markets such systems under the name "Memosens."

The most varied sensors can be connected to the measuring transducer. Under the aforementioned name, "Memosens," the applicant markets sensors for measuring pH value, conductivity, oxygen, turbidity, and other things.

Each of these sensors requires specific software from the measuring transducer. A corresponding device driver in short, driver must, in particular, be kept available in the measuring transducer. As mentioned above, the measuring transducer calculates a process value from the incoming raw data. The measuring transducer thus must know which type of sensor is connected in order to calculate either the pH value or the conductivity of a medium from the raw data. To this end, each sensor has an identification that is unique for its type and that is sent to a measuring transducer when the sensor is connected. For a sensor known to the measuring transducer, signal processing routines, parameters, menu navigation, field bus connection, etc., are provided in the measuring transducer. The sensor is parameterized, adjusted, and adapted by the measuring transducer to the process to be measured.

Since a wide variety of sensors can be connected to the measuring transducer, and since the software in the measuring transducer for a sensor is comprehensive, the production, maintenance, and testing of the operating software of the measuring transducer is very complex and expensive.

If a new sensor is to be supported by the measuring transducer, e.g., a new generation of a known sensor or a completely new sensor, the operating software of the measuring transducer must be adapted if necessary, completely. This new software must be distributed to all previous measuring transducers. Only after this distribution is the measuring transducer able to support the new sensor.

SUMMARY

The present disclosure is based upon the aim of simplifying the creation and maintenance of the software of the measuring transducer and, at the same time, achieving a subsequent expandability of a measuring transducer without having to replace its operating software.

The aim is achieved by a method comprising at least the steps of: starting the measuring transducer by starting its operating system, wherein the operating system provides at least one interface; starting at least one interpreter, wherein the interpreter accesses the interface; and executing an extension in the interpreter.

"Operating system" refers in this context to the entire operating software, or firmware, of the measuring transducer, which operating software generally consists of a real-time operating system, various driver layers, and application software modules.

In general, an interpreter is a computer program that, in contrast to assemblers and compilers, does not translate a program source code into a file that can be executed directly on the system, but reads, analyzes, and executes the source code. The analysis of the source code takes place during the runtime of the program.

In one embodiment, the interpreter is designed as an emulator more precisely, as a software emulator. An emulator is an interpreter, since the former processes the machine code of the guest system command-by-command or in command sequences on a "virtual processor." In other words, the emulator is an executing unit that executes the machine code of a certain architecture. A system that emulates another system in certain partial aspects is called an emulator. The simulated system receives the same data, executes comparable programs, and achieves results as similar as possible with respect to certain problems as the system to be emulated. Software emulators are programs that simulate computing units and thus allow the use of software for precisely this computing unit on a computing unit with a different architecture.

The interpreter can also be designed in the special form of an emulator, viz., in a virtual machine. The virtual machine can execute parts of the machine code of the guest system directly on the host system. The definition of "emulator" or "virtual machine" is not unambiguous in the literature, and is blurred. Within the meaning of this application, a "virtual machine" executes large parts of its commands natively on the CPU of the host system. Since many commands are executed directly on the CPU of the host system, the same CPU architecture must be used for the guest system as for the host system. In the process, the support of the processor and/or of the operating system of the host system is necessary, in order to allow for the abstraction between the guest system and the host system. During emulation, this is, however, not necessary. During emulation, a code deviating from the hardware or CPU can be executed. A common method is software emulation, which simulates all functions of individual hardware components in software. In this way, programs can be executed that were written for a different CPU. The software emulation can thus be realized in a platform-independent manner.

In one embodiment, the interpreter is designed as a script language interpreter.

In one embodiment, the script language can be Lua. "Lua" is an imperative script language that allows both functional and object-oriented programming. An advantage of Lua is the small size of the compiled script interpreter and the high execution speed. Lua programs can be developed independently of the platform.

In one embodiment, one or more script language interpreters and/or emulators can be started in parallel and also operated in parallel on a measuring transducer.

If the interpreter is started, an extension is subsequently executed on it. An extension is software that is not primarily a part of the measuring transducer, i.e., it is explicitly not part of the operating system. The extension is loaded at runtime. The extension is, in particular, loaded from a memory at runtime. The memory can in this case be implemented as solid-state memory integrated into the hardware of the measuring transducer (e.g., flash memory), in the form of removable memory accessible to the user (e.g., a memory card), or in the form of a network memory that is addressed by data communication (e.g., a file server).

In general, the extension is thus software code that is formulated in a certain (programming) language and executed on the measuring transducer. If the interpreter is designed as an emulator, the extension is formulated in machine code. If the interpreter is designed as a script language interpreter, the extension is formulated as specific software code in the example mentioned above, as Lua code.

In one embodiment, several interpreters can be executed per measuring transducer. In one embodiment, the interpreter can be instantiated dynamically. The program code of the interpreter is located once on the measuring transducer more precisely, in the memory of the measuring transducer and is executed when an instance is called. An instance is in this respect a specific occurrence of an object, i.e., of the interpreter in this case, which exists (only) during its runtime. In one embodiment, several interpreters are already statically loaded.

In one embodiment, precisely one extension is executed per interpreter. This has the result that the extensions can be executed independently of one another. Otherwise, the extensions would potentially have to know about each other or be designed such that they share the resources of an interpreter. This increases the interdependencies.

The operating system provides one or more interfaces that are used by the interpreter. The interpreter accesses the interfaces or interacts via the interfaces. The interface is the part of a system that is used for communication, i.e., for the exchange of information. The communication between two subsystems is possible only via the interface. It is of no importance to one subsystem how the respective other subsystem handles the information internally and how any responses come about. In this case, it is essentially about software interfaces. Software interfaces are generally logical points of contact in a software system; they allow and regulate the exchange of commands and data between various processes and components.

In order to highlight the advantages of the use of an interpreter with the execution of an extension therein on a measuring transducer, the disadvantages of the prior art are discussed briefly once again here.

For this purpose, FIG. 1 shows a symbolic illustration of the system architecture of a sensor arrangement with a measuring transducer and a sensor according to the prior art. On the part of the measuring transducer, a great deal of data regarding the sensor must be kept available, wherein the tasks of the measuring transducer and of the sensor are discussed below.

The sensor has the following tasks:

The sensor element has the task of detecting the physical or chemical measurand and of converting it to an electrical analog signal. In the case of a pH sensor with a glass membrane, a potential difference between a buffer solution and the medium to be measured is determined, for example.

The analog-to-digital conversion samples the time-continuous and value-continuous analog signal and converts it to a digital, time-discrete, and value-discrete output signal.

The raw signal processing has the task of optimizing the digital signal. This can, for example, be a median filter for filtering interfering signals, or even a mean value filter, in consequence of an oversampling of the input signal. The type of raw signal processing can differ, depending upon the sensor type.

The measuring transducer has the following tasks:

The sensor drivers contain the necessary information for the communication between the measuring transducer and the sensor. The driver is sensor-specific. Different sensor types require different sensor drivers. Each sensor type thus has its own driver. For all different sensor types, a separate driver must respectively be kept available on the part of the measuring transducer.

The signal processing is responsible for converting the (digital) raw signal to a physical measured value. The conversion of the raw signal to a physical measured value depends upon the variable to be measured and upon the measuring principle selected. In the case of the pH sensor with glass membrane, the raw signal is converted to a pH value using the Nernst equation, for example. For sensors with different measurands and measuring principles, other formulas for calculating the actual measured value are necessary, so that the signal processing varies, depending upon the sensor type.

The state machines control the most varied sensor-specific processes. For example, in order to calibrate a sensor, various states, which are controlled by the state machine, are passed through. The calibration is unique to each sensor type.

The menu navigation describes the hierarchy, navigation, and texts of the various menu pages that are shown on the display of the measuring transducer in order to guide the user. The menu navigation allows for selecting the desired command from an offering and having it executed. Adjustments, both on the measuring transducer and on the sensor, can be carried out via the menu navigation. The menu navigation varies depending upon the sensor type, since each sensor type can have different measurands, parameters, and functions.

The field bus connection is used to map the measured values and the parameterization options associated with the sensor onto a field bus (e.g., HART, Profibus PA, Profibus DP, Foundation Fieldbus, Modbus). The field bus connection is responsible for making parameters provided by the device accessible via the field bus. Each field bus has different options for structuring and representing data. The sensor-specific parameters and measured values therefore must be adapted to the options of the field bus used in a suitable manner.

The parameterization has the task of administering various changeable values. In a pH sensor, the parameters can, for example, be used to adjust in the sensor what type of calibration is to be carried out. Other options for the use of parameters are adjustable variables, such as the damping value, measurement accuracy, measuring interval, etc.

The measuring transducer comprises a database, which physically administers all system parameters. Some parameters are in this case the same for all sensor types. These are the measuring transducer-specific parameters, such as the firmware version or the serial number of the measuring transducer. Furthermore, there are the aforementioned sensor-specific parameters.

The measuring transducer furthermore comprises a graphical user interface that visually displays various contents, such as measurands, parameters, and system functions. The elements to be illustrated are defined in the menu navigation; see above. The parameters associated with the individual elements are stored in a database and can be retrieved therefrom. Depending upon the measuring transducer, the graphical user interface provides the user with different operating options, e.g., via a touch display, keys, rotary buttons, etc.

The measuring transducer furthermore comprises analog and/or digital outputs. The latter can, for example, output the measured value in the form of an analog current value or generate an alarm signal when settable limit values (sensor-specific parameters; see above) are exceeded.

In summary, the measuring transducer from the prior art must keep available a great amount of sensor-specific data, even for the sensor to be used. In addition, the possibilities for the measuring transducer are limited to the level with which it was delivered. A change in the functionality is provided only by a firmware update.

By starting an interpreter and executing an extension, the measuring transducer is essentially designed to be more flexible. Even after delivery to the user, software with a different functionality can be added. The functionality of the measuring transducer is not limited to its delivery condition. It is also easy to attend to user wishes; individual users want to measure, calculate, or display certain things with the measuring transducer, which is perhaps not interesting at all to other users. It is thus easy to adapt partial aspects of the operating software of the measuring transducer just for a certain user.

In addition, inherent measures for memory protection, and thus also for safety, result. A possible malicious code cannot access anything outside its interpreter and therefore cannot adversely affect the firmware or other running interpreters. There is a separation between the different interpreters, since no common memory areas are used. The different interpreters interact only via defined interfaces, so that only limited functions can be executed thereby. For example, a second interpreter affecting the parameterization of a first interpreter can be prevented, since the second interpreter only has read access. Changing the parameters of the first interpreter by the second interpreter is allowed only upon request. This right can be given by the user one time or in principle.

The interpreter in particular, in its embodiment as an emulator forms an environment for executing a "sensor intelligence" in the form of a virtual CPU with a virtual working memory. This system is, in this case, isolated from the rest of the system, i.e., from the host system, i.e., from the firmware of the measuring transducer. If an extension is defective, it does not affect the rest of the system. The rest of the system continues to run, even if the defective extension crashes. The communication takes place via interfaces to the graphical user interface (GUI), memory, field bus, etc.

The interpreter is implemented for a given platform. However, the software running on it, i.e., the extension in this case, is completely platform-independent via the abstraction by the interpreter. This thus makes it easier for the developer to maintain, and also develop and expand, the entire software for the measuring transducer.

Another advantage becomes apparent in the testing effort in the development of the software for the measuring transducer. The testing effort is significantly reduced, since no dependencies with respect to the sensor are present in the measuring transducer.

In one embodiment, the extension comprises sensor-specific software, and the following steps are executed: connecting a sensor to the measuring transducer; executing the sensor-specific software; and interaction of the sensor with the measuring transducer via the interface. In this way, an interaction of the measuring transducer with the sensor is made possible. As already mentioned, the extension is not part of the delivered firmware and can still be changed easily later, since the entire firmware doesn't have to be changed, but only this one specific extension. This applies to all extensions.

Executing the sensor-specific software as an extension in the interpreter ensures upward compatibility. In other words, a future sensor can in this way be connected to a present-day measuring transducer, and it will work. In general, upward compatibility is the usability or compatibility of older or obsolete versions under the application conditions of a newer version. This is ensured, since the extension can also be easily changed, as mentioned, after delivery of the measuring transducer. This is particularly apparent in the embodiment mentioned below, when the sensor-specific software is loaded by the sensor onto the measuring transducer.

In one embodiment, the sensor-specific software executes at least one of the steps of: executing the sensor driver; signal processing of sensor data; executing one or more state machines; parameterizing the sensor; installing the menu navigation of the sensor; or connecting the sensor to a field bus.

The steps of the sensor-specific software have already been discussed above and shall be amended at this point.

In general, the sensor driver ensures the interaction of the measuring transducer with the connected sensor. For this purpose, it communicates, on the one hand, with the sensor and exchanges control signals and data. On the other hand, the driver provides the measuring transducer with an interface so that the measuring transducer, or other extensions, can also access data, such as the measured data, of the sensor. In this way, the data of the sensor can also be accessed within the extension, "sensor-specific software".

In one embodiment, by installing the menu navigation, the settings, parameters, calibration processes, and adjustment processes required for the sensor can be adjusted or carried out. In one embodiment, this can also take place by means of a "wizard"; see below. In one embodiment, this is carried out by a state machine.

As with the sensor driver, for example, the sensor-specific menu navigation is also stored in the sensor-specific software. In one embodiment (see below), the sensor-specific software is located in the sensor. When the sensor-specific software, including the menu navigation, is executed in the interpreter, i.e., in the emulator, for example, generic interfaces are used to display individual menu pages and elements. For example, an interface is used to communicate to the measuring transducer which elements are to be displayed on a menu page.

In one embodiment, sensor-specific software is transferred to the measuring transducer, if it is not already located on the measuring transducer.

In one embodiment, the sensor-specific software is transferred from the sensor to the measuring transducer. The sensor-specific software is thus located in the sensor and not, as described in the prior art, in the measuring transducer.

The individual components of the sensor are physically located in the sensor for example, in the form of a complete software as byte code but the software is executed in the interpreter on the measuring transducer. To this end, the sensor-specific software must be loaded once by the measuring transducer, in order to subsequently be executed within its interpreter. The possibility, however, exists of using a byte code that is executed directly on the measuring transducer without using an interpreter, but this is only possible if an executing unit (e.g., a microcontroller) with a suitable (similar) architecture is used in the measuring transducer.

In other words, the sensor delivers a code that is executed on a measuring transducer. The sensor code either can be loaded once into the memory of the measuring transducer during an initial connection between a sensor and a measuring transducer or is already available. In this case, the sensor code is already available either as a standard feature or by use of the data stored during a previous connection.

In one embodiment, the sensor-specific software is transferred via a memory card or via a data connection of the measuring transducer. Examples of such a data connection include a (direct) connection to the internet for example, via the Ethernet or wirelessly, or even by means of field bus protocols, such as HART, Modbus, Fieldbus Foundation, Profibus, etc. The sensor-specific software can thus also be provided by a higher-level unit, such as a control center, and transferred to the measuring transducer via the communication connection.

In one embodiment, the following steps are carried out: providing the sensor-specific software on the measuring transducer; transferring an identification from the sensor to the measuring transducer; and executing the respective sensor-specific software based upon the identification of the sensor. These steps ensure the downward compatibility of the measuring transducer with older sensors. In general, downward compatibility is the usability or compatibility of newer or extended versions of a technical object or standard under the application conditions of an earlier version.

The sensor-specific software, such as the drivers (see above) of older sensors, is pre-installed on the measuring transducer at the time of delivery. An older sensor is identified on the measuring transducer, and the latter loads the corresponding software (drivers, signal processing routines, menu navigation, etc.) for the sensor from its memory.

In one embodiment, the following step is carried out: connecting several sensors to the measuring transducer, wherein sensor-specific software for each sensor is executed in a separate interpreter. In the process, the different interpreters access each other only via the interfaces. Since the different interpreters do not use a common memory area, it is also ensured, in the case of a crash of one interpreter, that the other interpreters continue to function flawlessly.

In one embodiment, the extension comprises a data processing module, which carries out at least the following steps: reading input values via the interface; processing the input values; and outputting the processed input values as output values via the interface.

In its simplest form, the data processing module is thus a math module that carries out calculations on input data and outputs them again. The data processing module can furthermore serve as a module for calculating chemometrics. In doing so, raw data is correlated with measurands by means of a model. The model can, in this case, be created by means of multivariate methods in particular, by structure-discovering methods, such as the main component analysis, or structure-verifying methods, such as artificial neuronal networks.

In one embodiment, the extension comprises a data source, which carries out at least the following steps: generating data; and outputting the generated data via the interface. The data are, for example, measured data, i.e., measured data are simulated thereby.

In one embodiment, the extension comprises a menu navigation adapted to a user. This extension defines the menu navigation or overwrites an existing menu navigation. It is possible that some menus are shown additionally, or that other menus are hidden. Differently experienced users are thus offered an adapted menu. An experienced user receives more setting options than an inexperienced user.

In one embodiment, the extension comprises an interface, by means of which a user is guided through one or more dialogs for an ergonomic data input. This is also called a "wizard." In the process, the user is guided through complex configuration options by rather simple dialogs. A calibration process can be controlled in this way, for example.

In one embodiment, the extension comprises an illustration, adapted to a user, of a system. To this end, the user can store an image, such as a photo or even a symbolic illustration, of his system in the extension. In the image, certain locations relevant to the user can be marked. For example, each sensor can thus be illustrated in the image according to its actual location. It is then immediately clear to the user which sensor supplies which data. If the measuring transducer comprises a touch display, the sensor can also be selected by appropriately touching it. In this way, the measured value illustration is simplified, but so is the parameterization, for example. In addition, the extension can be developed in a user-specific manner so that the plethora of state data and measured values provided by the measuring transducer can be brought into an illustration that is optimized for the use scenario of the user.

The aim is further achieved by a measuring transducer that is designed to carry out a method described above.

BRIEF DESCRIPTION OF THE DRAWINGS

The present disclosure is explained in more detail with reference to the following figures. These show.

DETAILED DESCRIPTION

Figure 1:
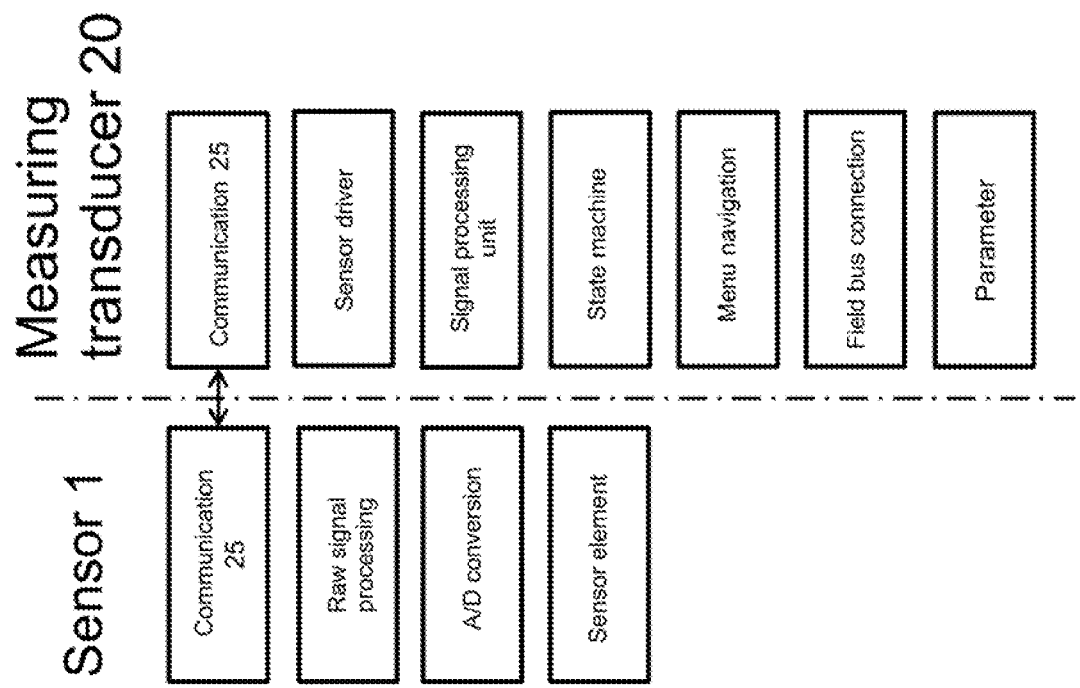

In the figures, the same features are marked with the same reference characters.

The claimed measuring transducer 20 is used in a sensor arrangement 10. The sensor arrangement 10 comprises a sensor 1 and a connection element 11, which shall be discussed first.

Figure 2A:
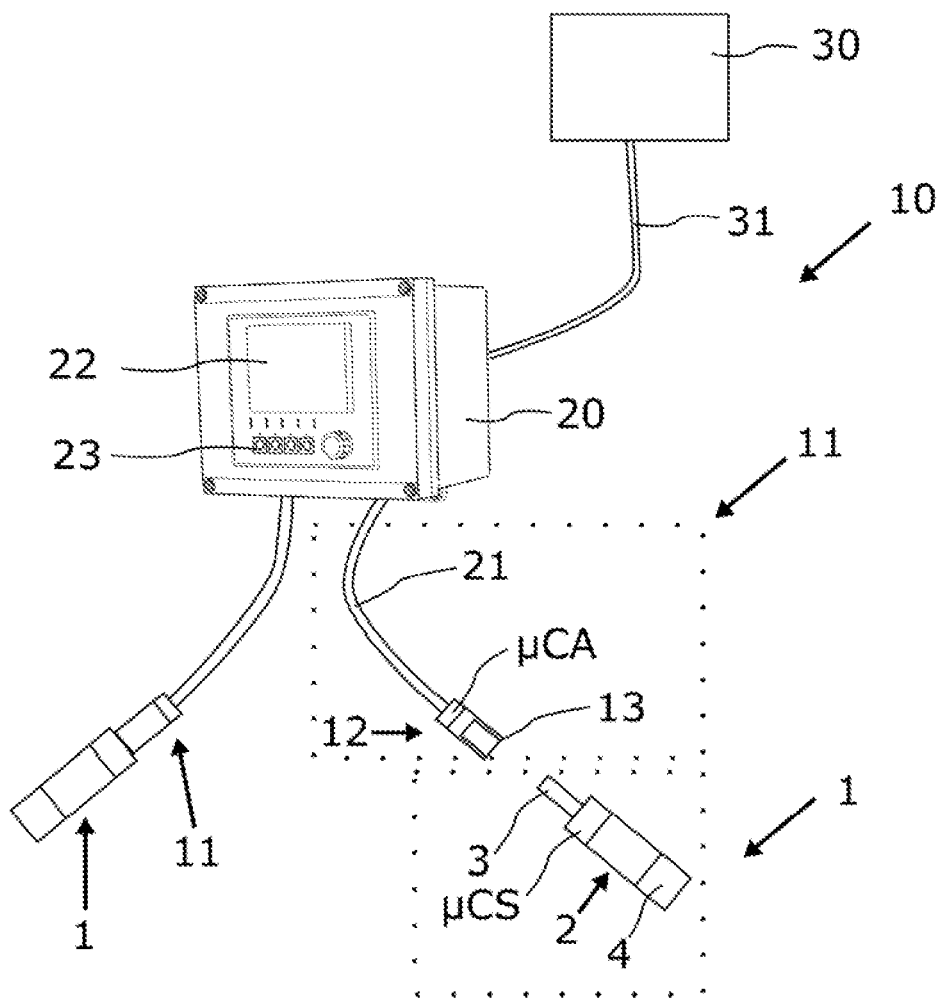
FIGS. 2A and 2B show a measurement arrangement comprising a measuring transducer in two different embodiments.

FIG. 2A represents a first embodiment of a sensor arrangement 10.

A sensor 1 communicates with a measuring transducer 20 via a first physical interface 3. An alternative word for measuring transducer is transmitter. The measuring transducer 20 in turn is connected to a higher-level unit 30, such as a control system, by a cable 31. A cable 21 is connected on the sensor side to the measuring transducer 20, and its other end comprises a second physical interface 13 that is complementary to the first physical interface 3. A connection element 11 comprises the cable 21, along with the second physical interface 13. The physical interfaces 3, 13 are designed as electrically isolated in particular, inductive interfaces. The physical interfaces 3, 13 can be coupled with each other by means of a mechanical plug connection. The mechanical plug connection is hermetically sealed, so that no fluid, such as the medium to be measured, air, or dust can enter from the outside.

Data (bi-directional) and power (uni-directional, i.e., from the connection element 11 to the sensor 1) are transmitted or transferred via the physical interfaces 3, 13. The sensor arrangement 10 is used predominantly in process automation.

The sensor 1 comprises at least one sensor element 4 for detecting a measurand of process automation. The sensor 1 is then, for example, a pH sensor, also [called] ISFET generally, an ion-selective sensor, a sensor for measuring the redox potential from the absorption of electromagnetic waves in the medium, e.g., with wavelengths in the UV, IR, and/or visible range, of the oxygen, of the conductivity, of the turbidity, of the concentration of non-metallic materials, or of the temperature, along with the respectively corresponding measurand.

The sensor 1 furthermore comprises a first coupling body 2, which comprises the first physical interface 3. As mentioned, the first physical interface 3 is designed for the transmission of a value that is a function of the measurand to a second physical interface 13. The sensor 1 comprises a data processing unit μCS, such as a microcontroller, which processes the values of the measurand, e.g., converts them into a different data format. The data processing unit μCS is designed for energy and space reasons to be rather small or economical with respect to the computing capacity and the memory volume. The sensor 1 is thus designed only for "simple" arithmetic operations for example, for averaging, preprocessing, and digital conversion.

Several sensors 1 can also be connected to a measuring transducer 20. Shown in FIG. 2A are two sensors 1, wherein only one of the two is provided with all of the reference characters. The same or different sensors can be connected. The left one of the two is shown in the plugged-in state. Up to eight sensors can be connected to the measuring transducer 20, for example.

The sensor 1 can be connected via the physical interfaces 3, 13 to the connection element 11, and ultimately to the measuring transducer 20. The data processing unit μCS converts the value that depends upon the measurand (i.e., the measurement signal of the sensor element 4) into a protocol that the measuring transducer 20 can understand. An example in this respect is, for example, the proprietary Memosens protocol. The first and second physical interfaces 3, 13 are thus designed for the bi-directional communication between the sensor 1 and the measuring transducer 20. As mentioned, in addition to the communication, the first and second interfaces 3, 13 also ensure the supply of power to the sensor 1.

The connection element 11 comprises the second physical interface 13, wherein the second physical interface 13 is designed to be complementary to the first physical interface 3. The connection element 11 likewise comprises a data processing unit μCA. The data processing unit μCA may also serve as a repeater for the transmitted signal. Furthermore, the data processing unit μCA can also convert or modify the protocol.

The connection element 11 comprises a second, cylindrical coupling body 12 that is designed to be complementary to the first coupling body 2 and can be slipped with a sleeve-like end portion onto the first coupling body 2, wherein the second physical interface 13 is plugged into the first physical interface 3. An opposite arrangement, in which the second physical interface 13 is designed to be sleeve-like and the first physical interface 3 is designed to be plug-like, is possible without any inventive effort.

The measuring transducer 20 comprises a display 22 and one or more operating elements 23, such as buttons or rotary buttons, by means of which the measuring transducer 20 can be operated. Measured data of the sensor 1 are displayed by the display 22, for example. The sensor 1 can also be configured and parameterized by means of the operating elements 23 and the corresponding view on the display 20 [sic].

The measuring transducer 20 directs (communication 35) the measured data via the cable 31, as mentioned, to a control system 30, for example. The control system 30 is in this case designed as a process control system (PLC, SPS), PC, or server.

To this end, the measuring transducer 20 converts the data into a data format that the control system can understand, e.g., into a corresponding bus, such as HART, Profibus PA, Profibus DP, Foundation Fieldbus, Modbus RS485, or even an Ethernet-based field bus, such as EtherNet/IP, Profinet, or Modbus/TCP. These data are then forwarded via the communication 35 to the control system 30. This can, if required, be combined with a web server, i.e., they can be operated in parallel to one another.

Figure 2B:
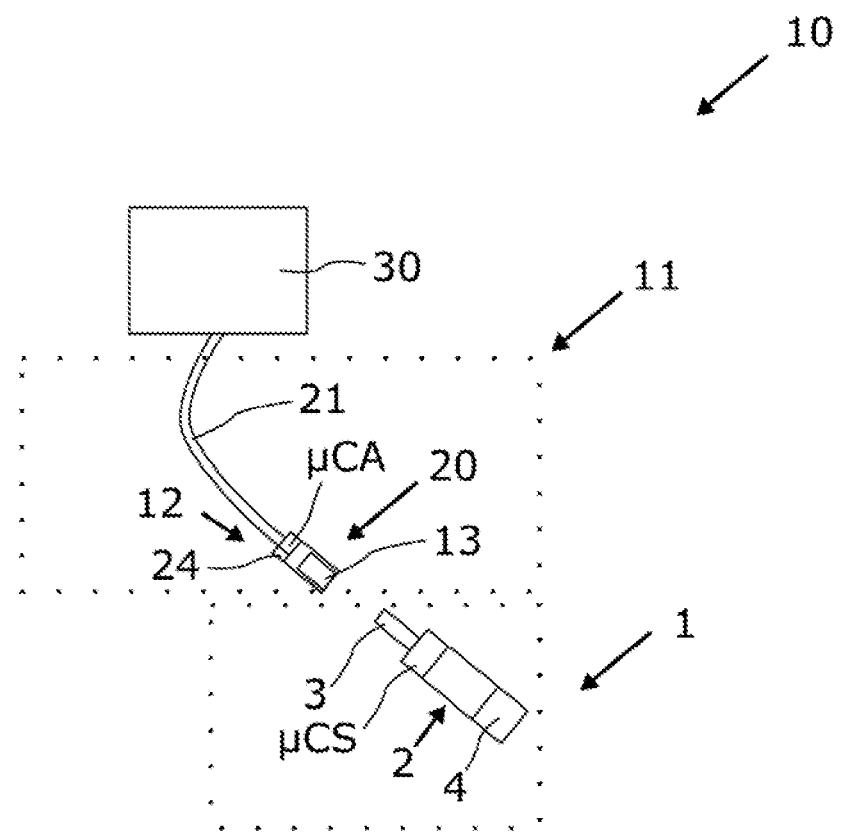

FIG. 2B represents a second embodiment of a sensor arrangement 10. In this case, only one sensor 1 respectively is connected to a measuring transducer 20. The measuring transducer 20 is in this case illustrated symbolically as a rectangle, is smaller in its dimensions than the measuring transducer from FIG. 2A, and is approximately the size of a matchbox. The measuring transducer 20 can in this case be designed as a separate unit that can be connected to the cable 21 or, as shown here, be integrated directly into the cable 21. The measuring transducer 20 thus consists essentially of the data processing unit μCA. The measuring transducer 20 does not comprise a display and has only one or two operating elements, if any, which are configured for a reset or for turning on and off. In this embodiment, the measuring transducer 20 preferably comprises no operating elements. The measuring transducer 20 therefore comprises a wireless module 24, such as a Bluetooth module, with the protocol stack Bluetooth Low Energy. A mobile device (not shown), such as a cellphone, tablet, laptop, etc., can thereby be wirelessly connected to the measuring transducer 20. The sensor can be configured and parameterized by means of the mobile device via the wireless module 24 using the wireless connection. The measuring transducer 20 converts the raw measured data such that they are directly transmitted to a higher-level unit 30, such as the control system (communication 35). As mentioned, data can, for example, be transmitted in a proprietary protocol from the sensor 1 to the connection element 11, while the data processing unit μCA converts this proprietary protocol into a bus protocol (Modbus, Foundation Fieldbus, HART, Profibus, EtherNet/IP; see above). The measuring transducers in FIG. 2A and FIG. 2B essentially have the same basic functionality.

As mentioned, in the prior art, a driver, as well as any signal processing, parameterization, etc., specific to the sensor, must be kept available in the measuring transducer 20; see also FIG. 1.

Figure 3:
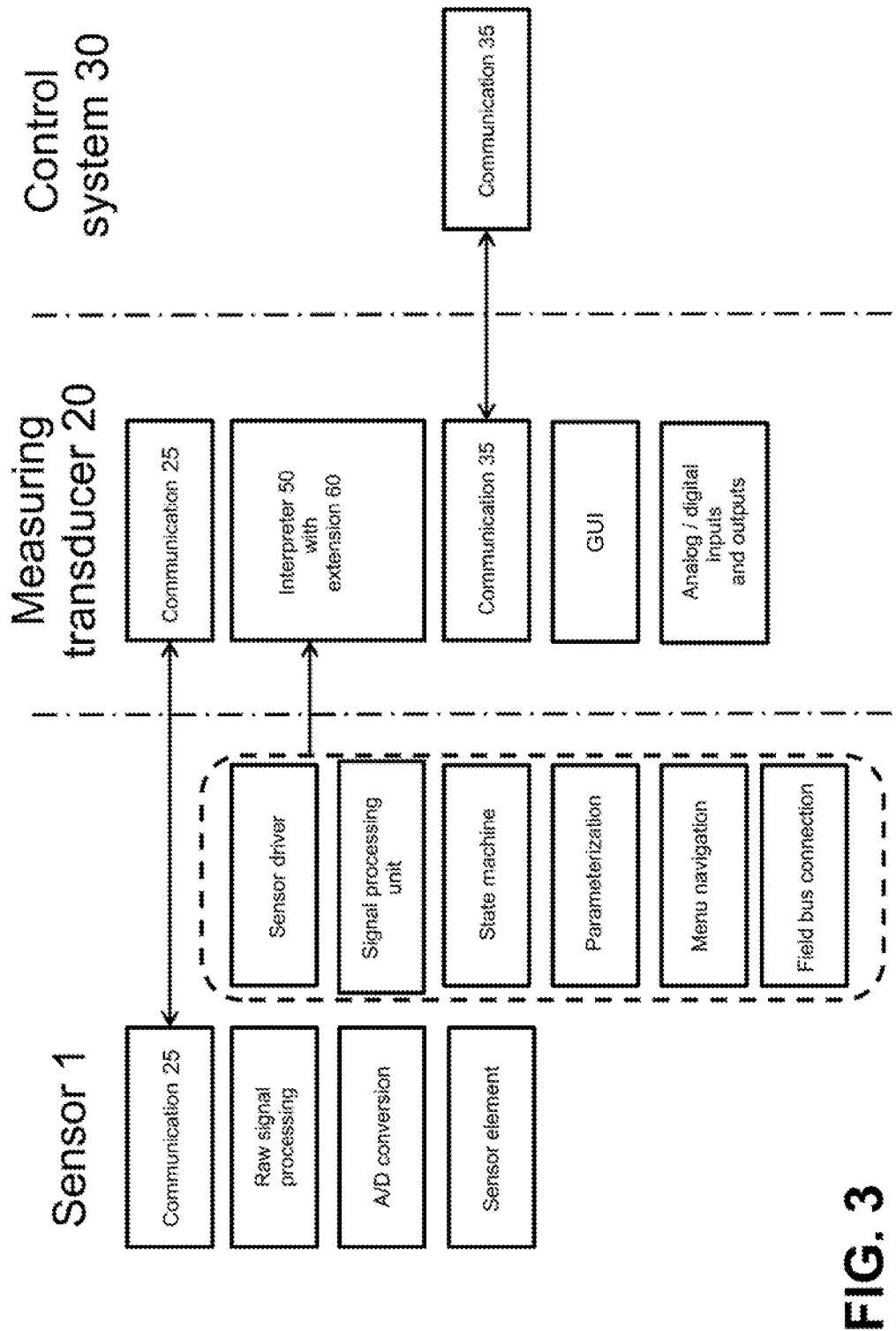
FIG. 3 shows a system architecture of a sensor arrangement for carrying out the method.

FIG. 3 shows a symbolic illustration of the system architecture as described in the claimed method. Before the architecture is described in more detail, the claimed method shall once again be briefly outlined in general.

Initially, the measuring transducer 20 is to be started; more precisely, the operating system OS of the measuring transducer 20 is started. In general, an operating system is a set of software modules that manages the system resources and makes these programs available. The operating system provides one or more interfaces S, which can be used by programs in this case, in particular, by an interpreter (see below). The term, "interface," is to be understood here and below as a software interface. The physical interfaces 3, 13 mentioned above, on the other hand, are designed as hardware interfaces.

The interface S is that part of a system which is used for communication, i.e., for the exchange of information. The communication between two subsystems is possible only via the interface. It is of no importance to one subsystem how the respective other subsystem handles the information internally and how any responses come about. As mentioned, this is about software interfaces. Software interfaces are, in general, logical points of contact in a software system; they allow and regulate the exchange of commands and data between various processes and components.

In the next step, an interpreter 50 is started on the measuring transducer 20, wherein the interpreter 50 accesses the interface S. Several interpreters 50 may also be started, wherein a communication between the various interpreters always takes place via the interface S only. The interpreter 50 can be instantiated. In general, an interpreter is a computer program that, in contrast to assemblers and compilers, does not translate a program source code into a file that can be executed directly on the system, but reads, analyzes, and executes the source code directly. The program is executed step-by-step during the runtime of the program, without the program being converted into the machine code of the target system beforehand.

In a first embodiment, an emulator more precisely, a software emulator is to be understood as an interpreter 50. An emulator is an interpreter, since the former executes the machine code of the guest system command-by-command by means of a "virtual processor." In the example shown, the interpreter 50 (aka emulator) executes the machine code of the guest system, i.e., of a sensor 1 connected to the measuring transducer 20, or its software interpretation ("sensor-specific software"; see below), command-by-command on a "virtual processor" on the measuring transducer 20.

In general, a system that simulates another system in certain partial aspects is called an emulator. The simulated system receives the same data, executes the same or at least comparable programs, and achieves results as similar as possible to the system to be emulated. Software emulators are programs that simulate a computer and thus allow the use of software for this computer on a computer with a different architecture.

In the interpreter 50, at least one preferably, precisely one extension 60 (per interpreter 50) is executed. Several interpreters 50 are executed per measuring transducer 20.

An interpreter 50 basically also comprises the special form of a virtual machine, which can execute parts of the machine code of the guest system on the host system.

In one embodiment, the interpreter 50 is not designed as an emulator, but as a script language interpreter. In one embodiment, this script language is Lua. Other examples are Python, VBA, Lisp, VBScript, or JScript. It is basically also possible to install and start various script language interpreters on a measuring transducer 20. As mentioned, the individual interpreters 50 communicate with each other via interfaces S. If these interfaces S are then implemented accordingly in the interpreters 50, communication between the various interpreters 50 is then also possible without difficulty.

If the interpreter 50 is started, an extension 60 is subsequently executed on it. An extension 60 is software that is not primarily a part of the measuring transducer 20, i.e., it is explicitly not part of the operating system OS. The extension is reloaded at runtime.

FIG. 3 shows the system architecture of the claimed method. It is similarly illustrated with blocks as in FIG. 1. It is to be noted that the sensor 1 is connected, i.e., hooked up, to the measuring transducer 20 in a first step. The sensor 1 sends a unique identification to the measuring transducer 20. Based upon this identification, the measuring transducer 20 determines whether the sensor 1, i.e., the type of sensor, is known to it. As mentioned, the measuring transducer 20 comprises an interpreter 50, on which an extension 60 is executed. Via the interfaces S, the sensor 1 can interact with the measuring transducer 20, or, via the interfaces S, the various interpreters 50 can, as mentioned, exchange data with each other.

In a first embodiment, all sensor-specific components are stored in the sensor 1. The sensor-specific components are also called sensor-specific software below. Within the meaning of this application, the sensor-specific software is an extension 60. The sensor-specific software thus constitutes signal processing of sensor data, one or more state machines, parameterization of the sensor, menu navigation of the sensor, or a field bus connection of the sensor. These software components are thus located physically in the sensor 1, e.g., in the form of complete software, as byte code. They are, however, executed on the measuring transducer 20 in an interpreter 50. To this end, the sensor-specific components must be loaded once onto the measuring transducer 20 in order to subsequently be executed within its interpreter 50. This generally takes place after connecting the sensor 1 to the measuring transducer 20, wherein the data communication protocol, required for the sensor 1, between the measuring transducer 20 and the sensor 1 is used.

The interpreter 50 is executed on all possible measuring transducers 20 as a common part; only the necessary interfaces S to its own components, such as the display, are specific to the measuring transducer, and are adapted accordingly. In doing so, the interpreter 50 can, for example, be written in a cross-platform programming language like C so that the source code of the interpreter is, in principle, then the same for all different platforms.

For each sensor 1 (cf. FIG. 2A) connected to the measuring transducer 20, a separate interpreter 50 is used. Each sensor 1 or its sensor-specific software is thus executed in a separate interpreter 50.

There is, basically, the possibility of using a byte code (for example, the one stored on the sensor 1) that is executed directly on the measuring transducer 20 without using an interpreter 50. However, this may possibly be disadvantageous, since different measuring transducers in some circumstances use different microcontrollers with different microarchitectures, on which a common machine code cannot be executed.

As an alternative to storing the sensor-specific software in the sensor 1, which software is downloaded onto the measuring transducer 20 as needed, the sensor-specific software is located on a memory card (such as an SD card), which is inserted into the measuring transducer 20, and transferred to it. In an alternative, the measuring transducer 20 establishes a data connection to the internet and downloads the software suitable for the respective sensor. Alternatively, a connection, e.g., to the control system 30, is established via the bus (see above, communication 35), and the control system 30 keeps the respective software available. Based upon a unique identification of the sensor 1, the respectively correct software is found. In an alternative, the sensor-specific software is already available on the measuring transducer 20. This can, for example, be the case with older sensors, wherein their specific software is already stored on the measuring transducer 20 at the time of delivery of said measuring transducer.

As mentioned, the measuring transducers 20 according to the prior art must keep available a lot of data for the sensor first and foremost, its drivers. In order to ensure a downward compatibility of the claimed measuring transducer 20 with older sensors 1, the claimed measuring transducer 20 comprises a memory, in which the data required by the old sensor, i.e., in particular, also its drivers, are stored. Accordingly, it is also possible with the measuring transducer 20 to support older sensors 1, i.e., sensors that do not keep their own sensor-specific software available.

The measuring transducer has upward compatibility. "Upward compatibility" in this respect means that sensors that appear after the measuring transducer are or can be supported as well. Previously, a complete software update of the measuring transducer was required for this purpose. Since newer sensors bring along their own sensor-specific software and transfer it when needed to the measuring transducer after a connection to the latter is established, a software update of the entire measuring transducer is no longer necessary. In this way, the newest version of a certain sensor driver can also always be provided for the measuring transducer.

In the manner described above, it is possible to connect a sensor to the measuring transducer, wherein the sensor-specific software is executed in an interpreter, as mentioned.

In addition to the execution of the extension as sensor-specific software, there are also other possible extensions. Some of them are introduced below. An interaction between the various extensions 60 is possible only via the interfaces S.

One possible extension is a data processing module. This data processing module reads input values via an interface S, processes the data further, and then outputs them as output values via an interface S. This module may, for example, be designed as a math module and carry out calculations on the input values. It is conceivable that the data processing module receives, via interfaces, data from another extension, such as the extension, "sensor-specific software," and processes them further, e.g., carries out an averaging or smoothing. In one embodiment, the data processing module can also include a control. The data processing module can also receive an input value of an external sensor, e.g., via analog current inputs (4 . . . 20 mA) or digital inputs, and possibly process it further and output it via analog current outputs or digital outputs.

The data processing module can also be understood as a data converter. As a result, various bus systems can, for example, be made compatible with each other. If a protocol is physically the same as another one, the sensor 1 or the measuring transducer 20 can communicate with each other by a mere calculation or conversion into the other format. As a result, a sensor 1, which is actually subject to a Modbus protocol, can, for example, be connected to a measuring transducer 20 that originally only understands the Memosens protocol mentioned at the beginning. Data can, furthermore, be processed such that they are transmitted via standard interfaces that are also possibly subject to standards, such as HTTP or HTTPS, etc. It is also possible to connect external data sources and data sinks. These are to be understood as, in particular, connections to servers and networks via known internet protocols, such as FTP, etc.

An example of an extension is a data source that exclusively generates data and outputs them via an interface S. This extension is thus a data simulation.

An example of an extension is a module for performing chemometrics. This extension can also be part of the extension, "data processing module."

An example of an extension is a menu navigation adapted to a user. This extension recognizes who is logged into the measuring transducer at the moment and/or which role the user has. Based upon this information, the menu navigation is changed and adapted.

A support especially, for unexperienced users is an extension by means of which a user [is] automatically guided through one or more dialogs. This is also known as a "wizard." Depending upon the answer to a first question, the user is asked a respective second question or provided with other answers. In this way, the user can, for example, be guided through a calibration process by means of step-by-step instructions.

An example of an extension is an illustration adapted to a user of a system, for example. To this end, the user can store an image, such as a photo or even a symbolic illustration, of his system in the extension.

Figure 4:
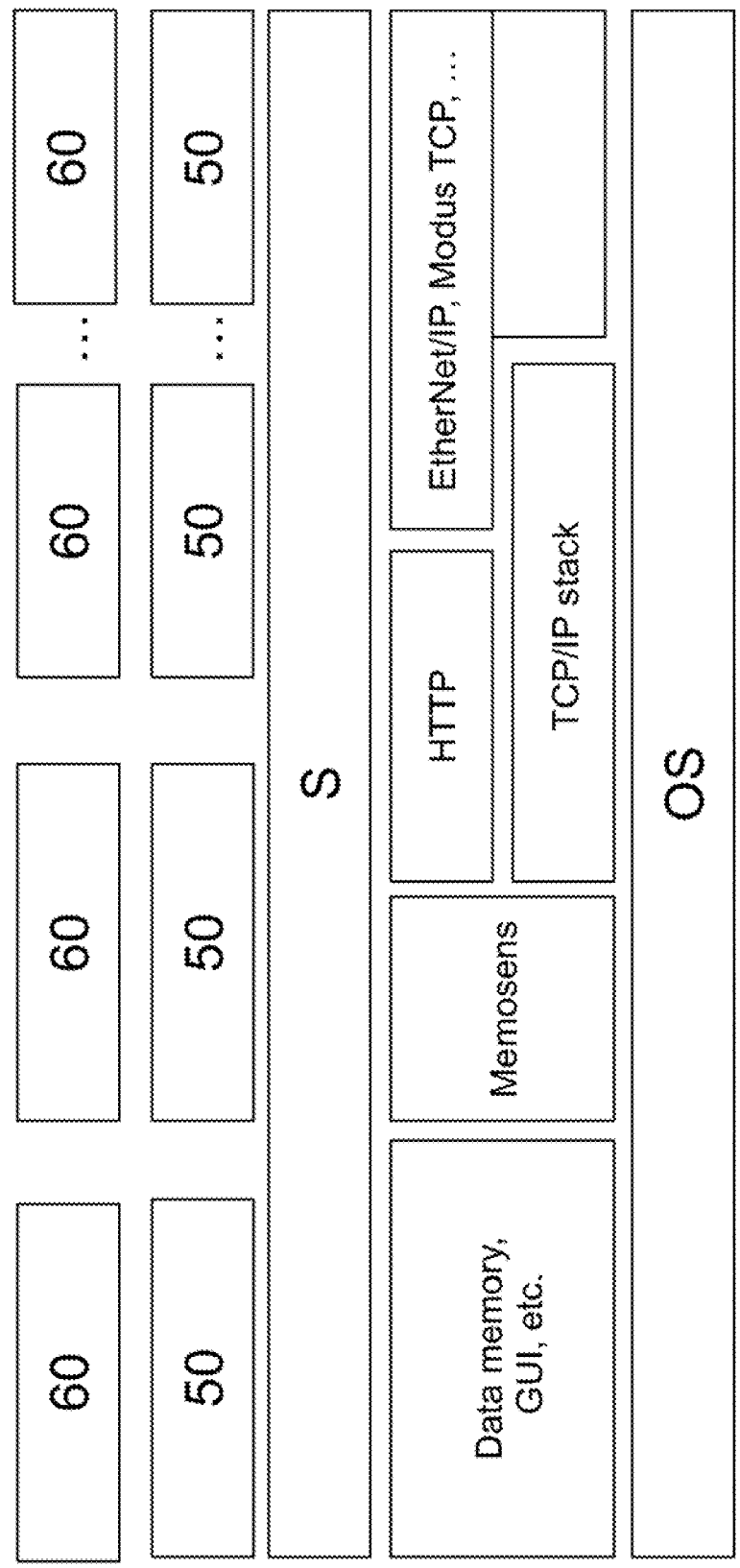
FIG. 4 shows a layer architecture of the sensor arrangement.

FIG. 4 shows a layer architecture of the sensor arrangement according to the claimed method. At the very bottom is the operating system OS, which is designed as a real-time operating system. Above it is the access to various communication protocols (such as HTTP, but also the communication protocol, "Memosens," of the applicant, bus connection) but also the data memory, the graphical user interface, etc. Above this are the interfaces S via which the interpreters 50 can access the aforementioned communication, data, etc. Several interpreters 50 are started; precisely one extension 60 runs in each of them.

The invention claimed is:

1. A method for operating a measuring transducer of process automation technology, wherein the measuring transducer includes:
   a microcontroller and an associated memory;
   a non-volatile memory;
   an operating system, wherein the operating system provides at least one software interface;

a first communication interface embodied to communicate with a sensor; and
a fieldbus interface embodied to communicate with a process control system, the method comprising:
starting the measuring transducer and starting the operating system;
instantiating a first interpreter in the measuring transducer, wherein the first interpreter is configured to access the at least one software interface;
providing a first sensor, including:
a sensor element;
a microcontroller and an associated memory; and
a second communication interface;
connecting the first sensor to the measuring transducer by connecting the second communication interface with the first communication interface;
transferring a unique identification from the first sensor to the measuring transducer;
executing a first extension in the first interpreter, wherein the first extension includes first-sensor-specific software, and wherein the first-sensor-specific software is determined based on the unique identification of the first sensor;
performing a measurement with the first sensor to obtain a first measured value;
transferring the first measured value from the first sensor to the measuring transducer;
processing the first measured value in the measuring transducer using the first-sensor-specific software; and
transferring the processed first measured value from the measuring transducer to the process control system.

2. The method according to claim 1, wherein the first interpreter is a software emulator.

3. The method according to claim 1, wherein the first interpreter is a script language interpreter, wherein the first extension including the first-sensor-specific software is a first script language program embodied to be interpreted by the first interpreter.

4. The method according to claim 1, wherein several interpreters can be executed per measuring transducer.

5. The method according to claim 1, further comprising:
the first sensor interacting with the measuring transducer via the at least one software interface.

6. The method according to claim 1, wherein the measuring transducer further includes a memory card reader, the method further comprising:
transferring the first-sensor-specific software to the measuring transducer, if it is not yet located on the measuring transducer, from at least one of the following locations: the first sensor, a memory card, and a data connection of the measuring transducer.

7. The method according to claim 1, wherein executing the first extension including the first-sensor-specific software includes:
executing a first sensor driver;
signal processing first sensor data;
executing one or more state machines;
parameterizing the first sensor;
installing a menu navigation of the first sensor; and
connecting the first sensor to a field bus.

8. The method according to claim 7, wherein, by installing the menu navigation, settings, parameters, calibration processes, and adjustment processes required for the first sensor can be adjusted or carried out.

9. The method according to claim 1, further comprising:
connecting a second sensor to the measuring transducer;
instantiating a second interpreter in the measuring transducer; and
executing a second extension in the second interpreter, wherein the second extension includes second-sensor-specific software.

10. The method according to claim 9, further comprising:
instantiating a third interpreter in the measuring transducer;
executing a third extension in the third interpreter, wherein the third extension includes a data processing module;
reading input values with the data processing module via the at least one software interface;
processing the input values with the data processing module; and
outputting the processed input values as output values with the data processing module via the at least one software interface.

11. The method according to claim 1, further comprising:
instantiating a second interpreter in the measuring transducer;
executing a second extension in the second interpreter, wherein the second extension includes a data source;
generating data with the data source; and
outputting the generated data with the data source via the at least one software interface.

12. The method according to claim 1, further comprising:
instantiating a second interpreter in the measuring transducer;
executing a second extension in the second interpreter, wherein the second extension includes a menu navigation adapted to a user.

13. The method according to claim 1, further comprising:
instantiating a second interpreter in the measuring transducer;
executing a second extension in the second interpreter, wherein the second extension includes an interface by which a user is guided through one or more dialogs for an ergonomic data input.

14. The method according to claim 1, further comprising:
instantiating a second interpreter in the measuring transducer;
executing a second extension in the second interpreter, wherein the second extension includes an illustration, adapted to a user, of a system.

15. The method according to claim 1, wherein the sensor element includes one of the following:
a pH sensor;
an ion-selective sensor;
an opto-chemical sensor;
a conductivity sensor;
a turbidity sensor; and
a temperature sensor.

16. A measuring transducer, comprising:
a microcontroller and associated memory;
a non-volatile memory;
a first communication interface;
a fieldbus interface embodied to communicate with a process control system;
a sensor including a sensor element embodied to detect a physical measurand and to convert the physical measurand to an electrical signal, the sensor including a unique identification, wherein the sensor is connected with the measuring transducer via the first communication interface;
an operating system having at least one software interface for the exchange of information; and at least one interpreter configured to access the at least one software interface,
wherein the measuring transducer is configured to:
 transfer from the sensor the unique identification; and
 transfer from the sensor sensor-specific software based on the unique identification,
wherein the at least one interpreter is embodied to execute an extension, wherein the extension includes the sensor-specific software.

17. The measuring transducer according to claim 16, further comprising:
a memory card reader,
wherein the measuring transducer is further configured to transfer from a memory card sensor-specific software based on the unique identification.

18. The measuring transducer according to claim 16,
wherein the measuring transducer is further configured to transfer from a network location via the fieldbus interface sensor-specific software based on the unique identification.

* * * * *